3,068,873
FILTERS

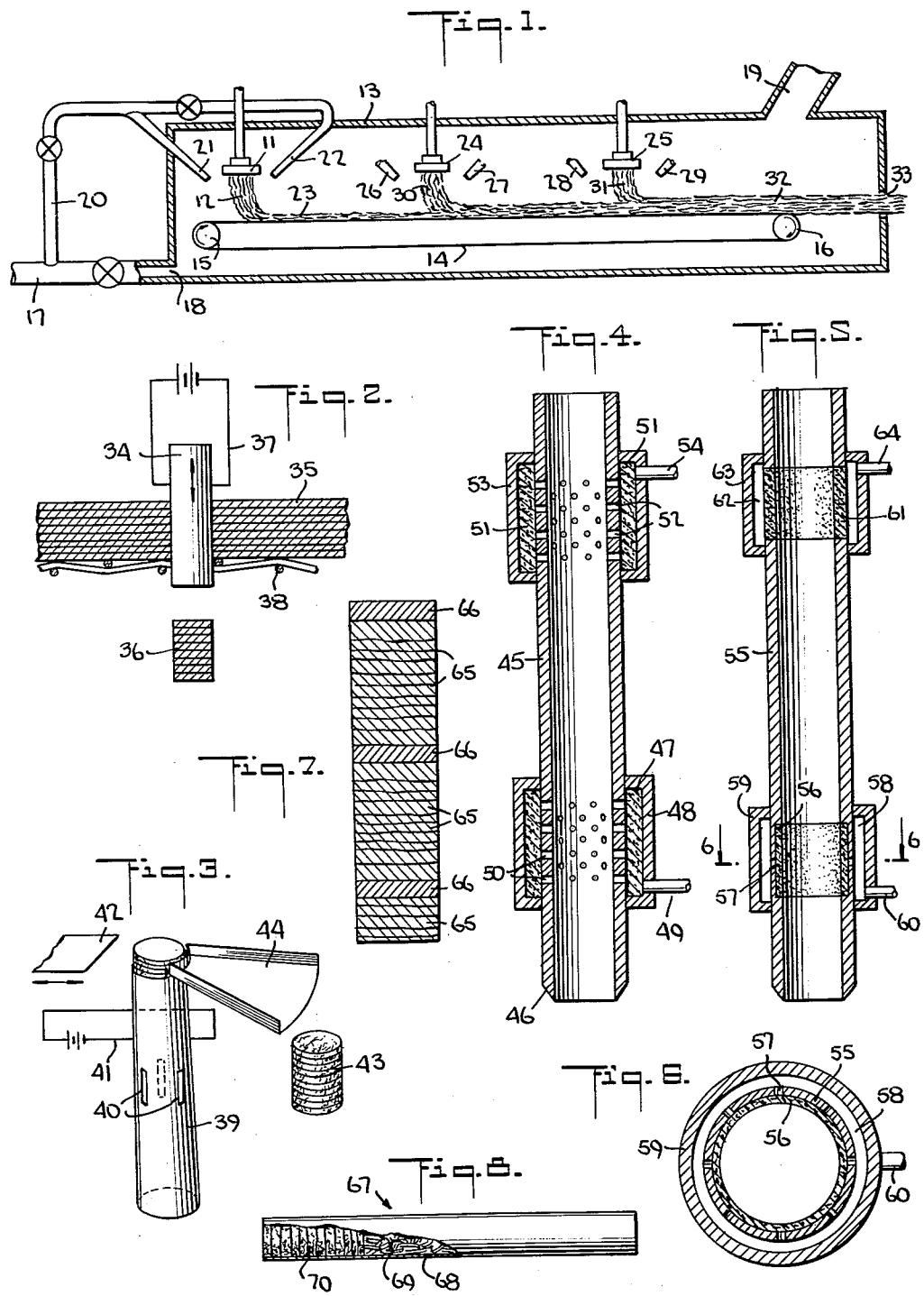

William T. Allman, Jr., Ralph G. Higgins, Jr., and Jack D. Underwood, Rock Hill, S.C., assignors to Celanese Corporation of America, New York, N.Y., a corporation of Delaware
Filed Nov. 24, 1958, Ser. No. 775,944
9 Claims. (Cl. 131—10)

The present invention relates to the formation of coherent structures comprising laminates of non-woven material.

It is an object of the present invention to provide non-woven fibrous structures of good filtration properties.

Other objects and advantages of the invention will become apparent from the following detailed description and claims.

In accordance with one aspect of the invention, a plurality of layers of non-woven webs of filamentary material are superposed and by stamping with a tubular cutter a cylindrical or prismatic body is cut out. Advantageously means are provided for bonding adjacent superposed layers to each other so that upon separation from the cutter the cylindrical body is a coherent structure. In accordance with a further aspect of the invention the cylindrical body may be of the necessary shape for incorporation into a cigarette as the filter element thereof.

The filamentary material constituting the non-woven web is desirably thermoplastic and/or solvent soluble so that bonding can readily be effected. In addition, this permits the material surrounding the cut-outs to be recovered by melting or dissolution for reconversion to new filamentary material, an obviously desirable economy.

While the individual non-woven webs may be formed in conventional manner and may comprise staple fibers, advantageously they comprise substantially randomly directed substantially continuous filaments which may be coalesced and fused at points of intersection. Advantageously such webs are formed as described in detail in copending application Serial No. 744,844, filed June 26, 1958. Briefly, filament-forming material in liquid phase is extruded through a plurality of orifices to form continuous filaments which are agitated, such as by blasting with air, while still mutually adhesive, whereby they swirl about and entangle randomly, generally with some coalescence. The filaments are continuously drawn away from the extrusion location in the form of a non-woven web or fleece. The web so produced is characterized by many small neps or entanglements of filaments which are especially useful in aiding filtration of aerosol particles passed through the web. In addition, the filaments themselves are characterized by pits, crenulations, cavities and striations which provide additional surface and additional traps for catching and holding aerosol particles.

The filaments of the web may be composed of any of many thermoplastic and/or solvent soluble materials such as nylon, linear polyesters such as polyethylene terephthalate or poly-glycolic acid, acrylonitrile polymers and copolymers, polymers and copolymers of olefins and vinyl esters such as ethylene, propylene, vinyl chloride, vinyl acetate, and the like. Advantageously they are composed of organic derivatives of cellulose, e.g. lower alkanoic acid esters thereof and preferably cellulose acetate. The cellulose acetate may be extruded as a solution in a volatile solvent such as acetone, methylene chloride, or the like, the particular solvent depending upon the degree of esterification of the cellulose.

When forming the web, particularly of cellulose acetate continuous filaments, the rate of extrusion, the take-up speed and the arrangement of the apparatus are preferably such that the individual webs going into the laminate have a thickness in uncompressed state of about 0.001 to 2.00 inches and preferably 0.1 to 1 inch. The density of the web ranges from about 1 or less up to 10 pounds per cubic foot and preferably 2 to 7 pounds per cubic foot; the density is determined by measuring the apparent volume occupied by a stack of webs of known weight superposed with a weight sufficient to apply a loading of 0.03 pound per square inch. The porosity, which is the percentage of the total volume occupied by air rather than filament-forming material, ranges from about 99 to 88% and preferably about 98 to 92%. The denier of the individual filaments ranges from about 1 to 20 and preferably 1.5 to 10; these filaments are characterized by the pits and striations previously described.

The superposed structure to be cut can be made by stacking either batchwise or continuously, or it can be made by extruding simultaneously through several spinnerettes offset in the direction of take-up of the webs. Each spinnerette will produce a non-woven web, successive spinnerettes depositing their webs on the product leaving the previous spinnerette so as directly to form a laminate.

Various adsorbents such as silica gel, charcoal, etc. can be deposited on the webs as formed along with pigments, detoxicants, agents which lower the frictional resistance to flow, etc., if desired.

However formed, the non-woven structure can be treated for formation of cylindrical bodies by a stamping operation performed with a cutting die, preferably heated, as by passage of an electric current therethrough, or the like. The heat facilitates cutting, it causes the thermoplastic material to shrink away from the cutter so as to facilitate removal of the cutter from the web and of the cylindrical body from the inside of the cutter, and it causes the peripheral filaments of the cylindrical body to be bonded together so that there is directly produced a plug which can be incorporated into cigarettes, if desired. The contour of the cutting die will of course correspond to the contour desired for the plug, although it should be slightly larger than the plug size to compensate for shrinkage of the plug. The cutting and bonding portions of the cutting die may be integral or they may be separate but operatively connected. The discharge of the plug from the cutter may be effected by gravity, by a plunger, by a pressurized fluid such as compressed air, or the like.

Alternately, the cutting element may also be open at the end opposite the cutting end so that previously cut cylindrical bodies are advanced through the cutter by successive cylindrical bodies. Means may be provided to bond the bodies at their peripheries, i.e. circumferences or outer edge portions, as they move therethrough so as to form a substantially continuous rod. Such means may constitute heating elements or solvent permeable portions such as apertures through which a volatile solvent or other bonding agent may be applied to the structures within the cutter. Means may also be provided for removing volatile solvent after bonding. In this way the filament ends produced by the cutting are fused to one another and the filaments at the periphery, i.e. circumference or perimeter, of each layer are caused to adhere or fuse to the similarly situated filaments of adjacent layers. Thus the adjacent layers are peripherally joined into a unitary structure although the faces, i.e. the tops and bottoms, of the layers are for the most part unchanged. Accordingly, when the layers are formed from continuous filament non-wovens, the filament continuity will be maintained except at the periphery of the cut out disk, i.e. each cut out disk will be substantially free of filament ends except at its periphery.

In an alternate arrangement, in the event that it is not desired to produce a continuous rod of the laminate, the superposed webs can be covered with a sheet of material which will not adhere to the filamentary material in the course of processing. Consequently the cylindrical body produced by any cut will be separated from adjacent cylindrical bodies by a layer of non-adherent material. Upon emerging from the cutter the cylindrical bodies will be separate.

The novel cylindrical bodies are especially useful as filters since they are normally free of plasticizers and bonding agents. When used in cigarettes, the filaments in each stratum extend generally transversely to the direction of smoke flow whereas in conventional tow filters the filaments are parallel to the direction of smoke flow. Because of the manner of its formation the periphery of each filter plug is firm and a separate cure is not necessary although it may be provided if desired. The firm periphery also eliminates the need for a separate paper wrapping for the plug itself, with obvious saving in time and material.

The plugs, because of compaction and shrinkage during heating, will generally be somewhat more dense than the layers from which they were formed. For cigarette filter plugs their density may range from about 10 to 25% and preferably 10 to 15% of that of solid blocks of the same size, i.e. 1 inch periphery and about 0.6 inch long. For cellulose acetate cigarette filter plugs the weight will vary from about 0.0035 to 0.0123 and preferably 0.0035 to 0.0088 ounce per plug, corresponding to a porosity of about 65 to 90% and preferably about 75 to 90%.

Where the component fleeces from which the webs are cut include continuous filaments, as contrasted with staple fiber webs, the center of the layers constituting each plug will be substantially free of fiber ends. The act of cutting will of course produce fiber ends on the periphery of the plug but these will in large part lose their identity in fusion, such fusion eliminating the need for a separate paper wrap, as explained hereinabove.

The invention will be more fully described with reference to the accompanying drawing wherein:

FIG. 1 is a schematic elevation (with the cabinet shown in section) of an apparatus for producing a laminated non woven;

FIG. 2 is a section through a stack of layers with a cutter and cylindrical body shown in elevation;

FIG. 3 is an elevation of another embodiment of cutter;

FIG. 4 is a section through another cutter;

FIG. 5 is a section through still another cutter;

FIG. 6 is a section taken along line 6—6 of FIG. 5;

FIG. 7 is a section through a stack of layers as they issue from a cutter; and

FIG. 8 is an elevation of a cigarette (with a portion of the wrapper torn away) incorporating a novel filter plug.

Referring now more particularly to the drawing, in FIG. 1 there is shown a spinnerette 11 through which a dope of thermoplastic filament-forming material dissolved in a volatile solvent is extruded as a mass of filaments 12. The spinnerette is positioned within a cabinet 13 above a wire screen 14 trained about shafts 15, 16 at least one of which is driven. Hot air is admitted to the cabinet 13 from a line 17 through opening 18 and leaves through exhaust 19. If desired, some hot air from line 17 may be passed through a line 20 and may be directed at the filaments 11 through nozzle 21 and/or nozzle 22 to cause the filaments to swirl about and contact each other while still mutually adhesive, i.e. before they have lost all their solvent.

When the filaments 11 reach the screen 14 they form a web or fleece 23 containing only a small proportion of the original amount of solvent. As the fleece 23 moves to the right it passes successively beneath spinnerettes 24, 25 provided respectively with nozzles 26, 27 and 28, 29. The spinnerettes 24, 25 produce their own filamentary entanglements 30, 31 which successively are deposited as fleeces on top of fleece 23 ultimately to produce a laminated fleece 32 which leaves cabinet 13 through an aperture 33 in the end wall.

The number of fleeces in a laminate will depend upon the thicknesses of the component fleeces and upon the height desired for the cylindrical cut-out bodies. As shown schematically in FIG. 2 a reciprocable tubular cutter 34 has just stamped out of a laminate 35 made up of eight layers a right circular cylindrical plug 36 which falls by gravity out of the cutter 34 when the cutter has fully penetrated the laminate 35. The cutter 34 constitutes the resistance element in an electrical circuit 37, whereby it is heated. While only a single cutter 34 is shown it is obvious that many cutters 34 may simultaneously operate upon the laminate 35 which is supported on a wide mesh screen 38, the openings of which are in registry with the cutters. Upon completing a stamping the cutter 34 rises and the laminate 35 is pulled to the right to permit a fresh area of laminate to be acted upon during the next down stroke of the cutter. The pieces of laminate between adjacent stamping holes permit pulling the laminate along.

FIG. 3 shows an alternate type of cutter 39 which can act upon the laminate. The cutter 39 is slightly tapered with its lower end larger than its upper end. It is provided with three longitudinally extending slots 40 in its wall and beyond the slots the cutter is heated by an electrical circuit 41. When a stamping out is made, the first material is wedged slightly into the cutter 39 and thereby held from falling out. The cylindrical body produced in the second stamping out pushes the first material up within the cutter 39. A solvent such as acetone is sprayed or brushed on the material within the cutter 39 through apertures 40. The solvent effects a bond between the layers of the laminate. On the next stamping, the first material reaches the area where the cutter is heated, thereby driving off the solvent. The material within the cutter finally issues from the upper end of the cutter where it is acted upon by a knife 42, to be cut into plugs 43 which slide down a guide 44 that cooperates with the knife. The component layers of plug 43 will be bonded to one another along longitudinal lines equal in position and number to the apertures 40.

In FIG. 4 there is shown a cutter provided with means for bonding adjacent layers about their whole peripheries. Cylindrical bodies comprising layers of material are formed from a laminate (not shown) by a cutter 45 provided with a cutting edge 46. Subsequent cuttings or stampings produce additional cylindrical bodies which force the first-formed layers past a porous or perforate cylinder 47 such as sintered metal. The sintered metal 47 is surrounded by an enclosure 48 communicating with a reservoir (not shown) for a solvent, binder or sealer by means of a pipeline 49. The solvent, either liquid or vapor flows through the porous cylinder 47 and through holes 50 in the cutter 45 to act on the peripheries of the cylindrical layers so as to bind them to one another.

After the peripheries have been fused, the rod-like material passes a region of the cutter which may be heated. Adjacent the end of cutter 45 another porous cylinder 51 is provided, surrounding holes 52 and in turn surrounded by an enclosure 53 which is evacuated through a line 54. Air and solvent vapors are thus withdrawn and the freshly bonded peripheries are dried.

A dry rod (not shown) is extruded out of the end of the cutter 45. This rod is made of numerous layers or disks stacked one on the other and fused at their peripheries. The dimensional stability is excellent. From this rod one can cut sections of desired lengths. If desired, the sintered metal cylinders 47 and/or 51 may be omitted although the introduction of solvent and withdrawal of solvent vapors will then not be as smooth and uniform. Alternatively, the sintered metal cylinders can be combined into a single long cylinder having a solvent inlet line at its upstream end and a solvent removal line at its downstream end, and surrounded by an impermeable jacket intermediate its ends.

In FIG. 5 there is shown a modified apparatus for supplying solvent to the layers. The inside of the cutter 55 is recessed for a short distance and a wick 56 is fitted into the recess. Small radial bores 57 (see FIG. 6) connect the recess with an annular solvent supply space 58 defined by an enclosure 59 and fed by a pipeline 60. Downstream on the cutter 55 there is provided a porous region 61 communicating with a zone 62 surrounded by an enclosure 63 and evacuated through a conduit 64. Region 61 is joined to the adjacent sections of the cutter 55 by welds, sweat joints, or the like.

In place of cutting the thus formed continuous rods into plugs of predetermined length, the plugs may be performed directly. As shown in FIG. 7, if it is desired to form plugs ten layers high, in each ten layers 65 of fusible or bindable material there is included an eleventh layer 66 of a material which will not become adhered to the other layers under the conditions prevailing within the cutter, e.g. a paper separator. The eleventh layer is shown on top but it could be elsewhere in the stack. Upon emerging from the cutter ten layers 65 will be bonded into an integral structure and will be separated from the next structure by the separator 66. As can be seen, the individual layers of the laminate need not be identical in thickness, and their composition can also vary, different additives being incorporated in some of the layers if desired.

The cutters and procedures for forming plugs will clearly be operable whether the layers of the laminate are woven, knit, non-woven, etc. Non-wovens are preferred, however, since they are inexpensive to manufacture but nonetheless produce cigarette filters of good efficiency because the filaments, though random within each layer, generally extend transversely of the direction in which smoke flows.

In FIG. 8 there is shown a cigarette 67 comprising a paper wrapper 68 enclosing a rod of tobacco 69 and a novel plug 70 composed of a plurality of bonded layers. Because of the fusion of the periphery, each plug does not have to be separately wrapped with paper prior to wrapping in the cigarette paper, as is customary when working with tow filters. The novel plugs do not require addition of plasticizer and a cure to render them sufficiently firm for use.

The following example is given to illustrate the invention further.

*Example*

An acetone solution of cellulose acetate, having an acetyl value of 55% calculated as acetic acid, is extruded at a linear speed of 11,000 feet per minute through a spinnerette having 60 apertures into a cabinet through which air is circulated. Air is impinged on the falling filaments to cause them to whirl about and entangle. The entangled filaments are taken up as a non-woven fleece at a linear speed of 13 feet per minute. The fleece has a density of 0.32 pound per cubic foot, a thickness of 0.5 inch and weighs 1.9 ounces per square yard. The individual filaments range in denier from about 1.8 to 7.

Five such fleeces were stacked on a hard wooden base. A cutter, having an inside circumference of 1 inch and having three narrow slits 1 inch long, was placed on the stack and struck by hand with a mallet, thereby driving five laminae into the cutter. The process was repeated dozens of times until laminae in the barrel of the cutter extended beyond the slits in both directions. About 5 cc. of acetone were sprayed at the cutter adjacent the slits. The cutter and contents were warmed at 70° C. until completely dry after which the contents were pushed out and trimmed to a plug 0.6 inch long. The plug weighed 0.0088 ounce, had a pressure drop of 50 mm. of water and a total smoke solids removal efficiency of 16%.

The "total smoke solids removal efficiency" is determined by smoking a cigarette mechanically and collecting all the solids in the smoke. An identical cigarette is then smoked through the test filter whose weight is determined before and after smoking. The increase in filter weight indicates the amount of smoke solids filtered out and the percentage which this is of the solids collected without a filter is the "total smoke solids removal efficiency."

It is to be understood that the foregoing detailed description is given merely by way of illustration and that many variations may be made therein without departing from the spirit of our invention.

Having described our invention what we desire to secure by Letters Patent is:

1. A porous filter body comprising a plurality of superposed layers fused to one another at their outer edge portions, said layers comprising thermoplastic filaments extending in random directions for comparatively short portions of their total lengths within each layer and extending throughout their total lengths generally transversely of the direction of the flow path of the material to be filtered.

2. A porous filter body according to claim 1 having a porosity of about 65 to 90%.

3. A porous filter body according to claim 1, wherein said thermoplastic filaments comprise cellulose acetate.

4. A porous filter body according to claim 1, wherein the filaments range in denier from about 1 to 20.

5. A porous filter body comprising substantially randomly directed thermoplastic filaments in sheet form substantially free of filament ends except at the outer edge portion of said body, said filaments being bonded to one another at their points of intersection and fused together at the outer edge portion of said body.

6. A substantially cylindrical porous filter body comprising a plurality of superposed layers bonded to one another at their outer edge portions, said layers comprising substantially randomly directed thermoplastic filaments bonded to one another at their points of intersection and being substantially free of filament ends except at their outer edge portions.

7. A substantially cylindrical filter body having a porosity of about 65 to 90% and comprising a plurality of superposed layers fused to one another at their outer edge portions, said layers comprising substantially randomly directed cellulose acetate filaments and being substantially free of filament ends except at their outer edge portions.

8. A filter cigarette having incorporated therein as the filter element a porous filter body as claimed in claim 1.

9. A filter cigarette having incorporated therein as the filter element a substantially cylindrical filter body having a porosity of about 65 to 90% and comprising a plurality of superposed layers fused to one another at their outer edge portions, said layers comprising substantially randomly directed cellulose acetate filaments bonded to one another at their points of intersection and being substantially free of filament ends except at their outer edge portions.

References Cited in the file of this patent

UNITED STATES PATENTS

| | | |
|---|---|---|
| 2,484,003 | Simison | Oct. 4, 1949 |
| 2,675,852 | Pasquale | Apr. 20, 1954 |
| 2,688,380 | MacHenry | Sept. 7, 1954 |
| 2,724,423 | Harris | Nov. 22, 1955 |
| 2,772,785 | Kramer | Dec. 4, 1956 |
| 2,789,563 | Taylor et al. | Apr. 23, 1957 |
| 2,792,006 | Marek | May 14, 1957 |
| 2,867,219 | Hug | Jan. 6, 1959 |

FOREIGN PATENTS

| | | |
|---|---|---|
| 406,401 | Great Britain | Mar. 1, 1934 |